(No Model.)

J. T. REDINGTON.
TOOTHED WHEEL.

No. 408,435. Patented Aug. 6, 1889.

WITNESSES:
W. R. Davis
E. Sedgwick

INVENTOR:
J. T. Redington
BY Munn & Co.
ATTORNEYS.

UNITED STATES PATENT OFFICE.

JOHN T. REDINGTON, OF AMBLER, PENNSYLVANIA, ASSIGNOR OF ONE-HALF TO THOMAS REDINGTON, JR., OF SAME PLACE.

TOOTHED WHEEL.

SPECIFICATION forming part of Letters Patent No. 408,435, dated August 6, 1889.

Application filed November 6, 1888. Serial No. 290,071. (No model.)

*To all whom it may concern:*

Be it known that I, JOHN T. REDINGTON, of Ambler, in the county of Montgomery and State of Pennsylvania, have invented a new and Improved Toothed Wheel, of which the following is a full, clear, and exact description.

My invention relates to toothed wheels, and has for its object to improve the construction of the toothed wheel for which I filed an application for Letters Patent May 17, 1888, Serial No. 274,154, which has been allowed, and to provide a wheel of simple and durable construction wherein removable toothed sections may be employed adapted for insertion in the periphery of the wheel, which sections may be flush at the side with the equivalent rim-surface of the wheel and whereon the teeth may extend from side to side of the sections, or from one side of the wheel to the other.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
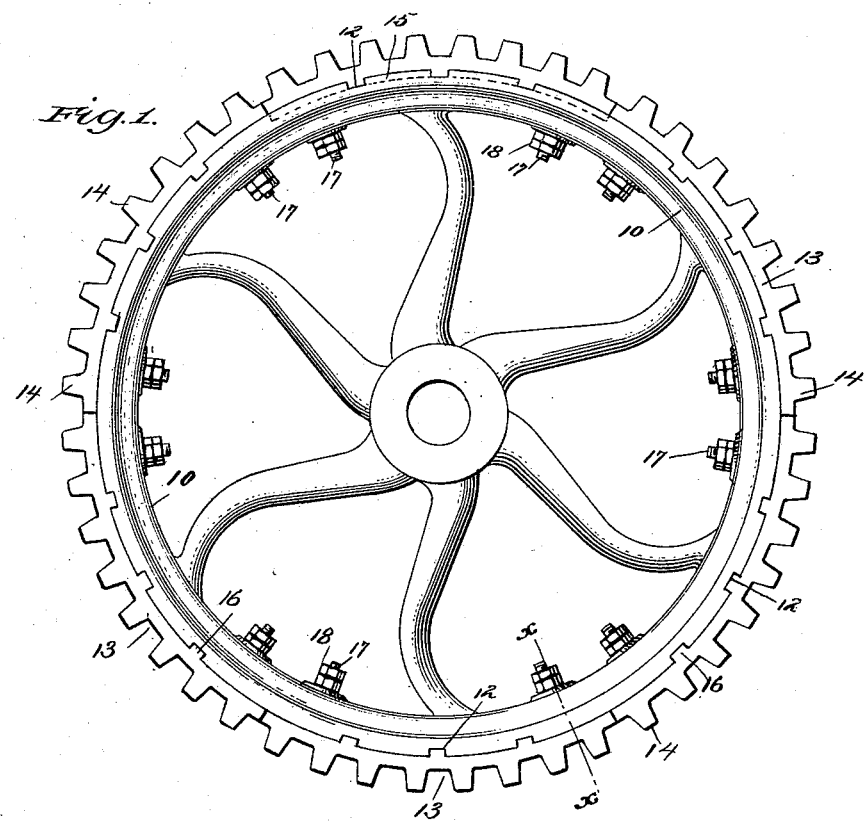
Figure 2:
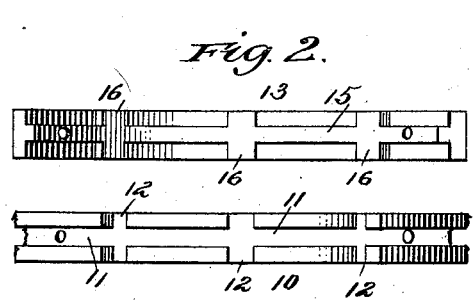

Figure 1 is a front elevation of the improved wheel. Fig. 2 is a partial plan view of the periphery of the wheel and a bottom plan of one of the detachable sections, and Fig. 3 is a transverse section on line $x$ $x$ of Fig. 1.

In carrying out the invention the body of the wheel 10 is formed in any well-known manner and cast or otherwise produced from any desirable or suitable material. The periphery of the wheel is provided with a central continuous peripheral groove 11 and at intervals with diametrical peripheral grooves 12, extending from side to side and crossing the central groove, as best shown in the lower illustration of Fig. 2. A series of segmental blocks 13 are adapted for attachment to the periphery of the wheel, which blocks carry upon their outer face one or more teeth or sprockets 14, preferably more than one. The blocks are of a width corresponding to the width of the wheel-rim, and the teeth are preferably of like width with the blocks, although, if desired, the teeth or sprockets may be of less width than the blocks, in which event a space is made to intervene the outer edge of the block and outer side surface of the teeth, (see Fig. 3,) thereby forming a bearing upon the blocks for the sides of the chain belt, preventing the latter from wearing the body of the wheel. The under surface of each block is provided with a central longitudinal rib 15 and spaced transverse ribs 16, intersecting the longitudinal rib, as best illustrated in the upper illustration of Fig. 2. The transverse ribs on the blocks and the diametrical grooves in the wheel are provided, in order that the several segmental blocks which constitute the working periphery of the wheel may be securely held in a fixed position, and whereby the strain will be taken off the fastening-bolts.

Figure 3:
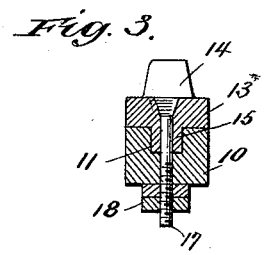

In making up the wheel the transverse and longitudinal ribs of the several block-sections employed are made to enter, respectively, the diametrical and peripheral grooves of the body, and as a further means of securing the segmental blocks in their position in the body two or more bolts 17 are passed through each section from the top, one preferably near each end, the said bolts being projected through the body of the wheel and retained in place through the medium of suitable lock-nuts 18, engaging bosses formed upon the inner face of the rim of the wheel, as best shown in Figs. 1 and 3. The bolts are preferably provided with essentially wedge-shaped heads, as shown in Fig. 3, whereby they are prevented from turning when drawn to place.

I desire it distinctly understood that I do not limit myself to the bolts as a means of securing the segmental blocks to the body of the wheel, or to any particular metal or metals in the construction of said wheel and the said segmental blocks, or to any special number of transverse ribs and diametrical grooves.

It will be readily understood that by simply withdrawing the bolts any one or more damaged sections may be taken out from the wheel and others substituted without disturbing the perfect sections or the wheel itself, thereby obviating the necessity of taking down shafting, hangers, belting, &c., and causing expensive and vexatious delays consequent upon the substitution of a new wheel, and also the cost of such wheel.

Having thus described my invention, what I claim as new, and desire to secure by Letters Patent, is—

1. The combination, with a wheel provided with a peripheral groove and diametrical grooves crossing the same, of a series of segmental blocks of a width corresponding to the width of the wheel-rim, and having teeth or sprockets upon the outer face and longitudinal and transverse ribs upon the inner face adapted to enter the corresponding grooves of the wheel, substantially as and for the purposes specified.

2. The combination, with a wheel provided with a peripheral groove and diametrical grooves crossing the same, of a series of segmental blocks of even width with the periphery of the wheel, having teeth or sprockets upon the outer face and longitudinal and transverse ribs upon the inner face adapted to enter the corresponding grooves of the wheel, and means, substantially as shown and described, for locking the segmental block to the wheel, as and for the purposes specified.

JOHN T. REDINGTON.

Witnesses:
JOS. A. BUCHANAN,
GEO. B. CONWAY.